(12) United States Patent
Nakashima

(10) Patent No.: US 7,854,300 B2
(45) Date of Patent: Dec. 21, 2010

(54) HALL DISPLAY DEVICE FOR ELEVATOR

(75) Inventor: Hidenobu Nakashima, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1187 days.

(21) Appl. No.: 10/586,867

(22) PCT Filed: Dec. 21, 2004

(86) PCT No.: PCT/JP2004/019077

§ 371 (c)(1),
(2), (4) Date: Jul. 21, 2006

(87) PCT Pub. No.: WO2006/067834

PCT Pub. Date: Jun. 29, 2006

(65) Prior Publication Data

US 2010/0219024 A1    Sep. 2, 2010

(51) Int. Cl.
*B66B 1/34* (2006.01)
(52) U.S. Cl. .................. 187/396; 187/391; 187/382
(58) Field of Classification Search ................. 187/247, 187/380–388, 391–396
See application file for complete search history.

(56) References Cited

U.S. PATENT DOCUMENTS

| | | | |
|---|---|---|---|
| 6,394,231 B1 * | 5/2002 | Schuster et al. | ............ 187/382 |
| 7,021,429 B2 * | 4/2006 | Hikita | ......................... 187/398 |
| 7,036,635 B2 * | 5/2006 | Rintala et al. | ................ 187/396 |
| 7,040,458 B2 * | 5/2006 | Forsythe et al. | ............. 187/396 |
| 7,040,459 B2 * | 5/2006 | Matsuda et al. | ............. 187/399 |
| 7,445,090 B2 * | 11/2008 | Bodmer et al. | .............. 187/391 |
| 7,591,348 B2 * | 9/2009 | Takeuchi | ..................... 187/391 |

FOREIGN PATENT DOCUMENTS

| | | |
|---|---|---|
| JP | 55 135075 | 10/1980 |
| JP | 83865 1990 | 6/1990 |
| JP | 3 259880 | 11/1991 |
| JP | 2000 219443 | 8/2000 |
| JP | 2000 272850 | 10/2000 |

* cited by examiner

*Primary Examiner*—Jonathan Salata
(74) *Attorney, Agent, or Firm*—Oblon, Spivak, McClelland, Maier & Neustadt, L.L.P.

(57) ABSTRACT

An elevator hall display device. A destination floor registration device includes destination buttons and assigned car display panels. An elevator group supervisory controller includes a hall destination call registration section that registers a hall destination call corresponding to an operation of a destination button, an assigned car decision section that decides an assigned car to respond to the hall destination call, an assigned car display mode controller that sets a display mode of the assigned car, and an assigned car display that makes the assigned car displayed on an assigned car display panel in the set display mode. The assigned car display mode controller sets the assigned car display to a first display mode until a predetermined time elapses from start of display of the assigned car on the assigned car display panel, and sets the display of the assigned car to a second display mode after the predetermined time elapses.

5 Claims, 8 Drawing Sheets

HALL DISPLAY DEVICE FOR ELEVATOR

TECHNICAL FIELD

The present invention relates to a hall display device for an elevator with a destination button being installed on each hall, and more particularly, to a new technique for enabling a passenger, who operates a destination button in a hall, to clearly recognize an assigned car that is to respond to a hall destination call.

PRIOR ART

In general, a destination floor registration device is installed on each hall in the form of a service floor for an elevator car, and destination buttons and assigned car display panels are arranged adjacent to each other on the destination floor registration device. In addition, the destination floor registration device is connected to a hall destination call registration section and an assigned car display section in an elevator group supervisory control apparatus.

Accordingly, when a destination button of the destination floor registration device is operated in a hall to register a hall destination call, an assigned car that should respond to the hall destination call is decided in an elevator group supervisory control apparatus, so that the assigned car is displayed on an assigned car display panel of the destination floor registration device.

Further, as a conventional hall display device for an elevator, there has been proposed one that serves to enable a user to easily recognize an elevator on which the user should actually ride by continuing an indication of an assigned car on an assigned car display panel until the assigned car arrives at a passenger's waiting floor where a destination button has been operated by the user (see, for example, a first patent document).

[First Patent Document] Japanese patent application laid-open No. 2000-272850

DISCLOSURE OF THE INVENTION

Problems to be Solved by the Invention

In the conventional hall display device for an elevator as described above, an assigned car for each registered destination floor is displayed, so in case where hall destination calls for a multitude of floors are registered, a lot of assigned cars are also displayed, and hence there has been a problem that it takes time for a passenger to recognize, from among them, an assigned car corresponding to his or her destination floor.

In addition, there has also been a problem that when a destination button already registered is operated again, it is impossible to quickly determine which one is the display of an assigned car corresponding to the destination floor operated, so confusion occurs on which elevator machine is to be ridden on.

Means for Solving the Problems

A hall display device for an elevator according to the present invention includes: an elevator group supervisory control apparatus that controls a plurality of elevator cars; and a destination floor registration device that is connected to the elevator group supervisor control apparatus, and installed in each of halls corresponding to service floors for the plurality of elevator cars, the destination floor registration device having destination buttons and assigned car display panels that are arranged adjacent to the destination buttons, respectively. The elevator group supervisor control apparatus includes: a hall destination call registration section that registers a hall destination call corresponding to an operation of the destination button; an assigned car decision section that decides an assigned car that is to respond to the hall destination call; an assigned car display mode control section that sets a display mode of the assigned car; and an assigned car display section that makes the assigned car displayed on one of the assigned car display panels in the display mode set by the assigned car display mode control section. When the hall destination call is registered and the assigned car is decided in response to the operation of the destination button, the assigned car is displayed on the one assigned car display panel. The assigned car display mode control section sets the display of the assigned car to a first display mode over a period of time from the start of the display of the assigned car on the one assigned car display panel until a predetermined time has elapsed, and sets the display of the assigned car to a second display mode after the predetermined time has elapsed from the start of the display of the assigned car.

Effects of the Invention

According to the present invention, by enabling a passenger, who operated a destination button in a hall, to clearly recognize an assigned car that is to respond to a hall destination call, the passenger can be smoothly guided to ride on the assigned car upon arrival thereof at the hall.

BEST MODE FOR CARRYING OUT THE INVENTION

The present invention is intended to solve the problem as referred to above, and has for its object to obtain a hall display device for an elevator which enables a passenger, who operated a destination button in a hall, to clearly recognize an assigned car that is to respond to a hall destination call, so that the passenger can be smoothly guided to ride on the assigned car.

Embodiment 1

Figure 1:
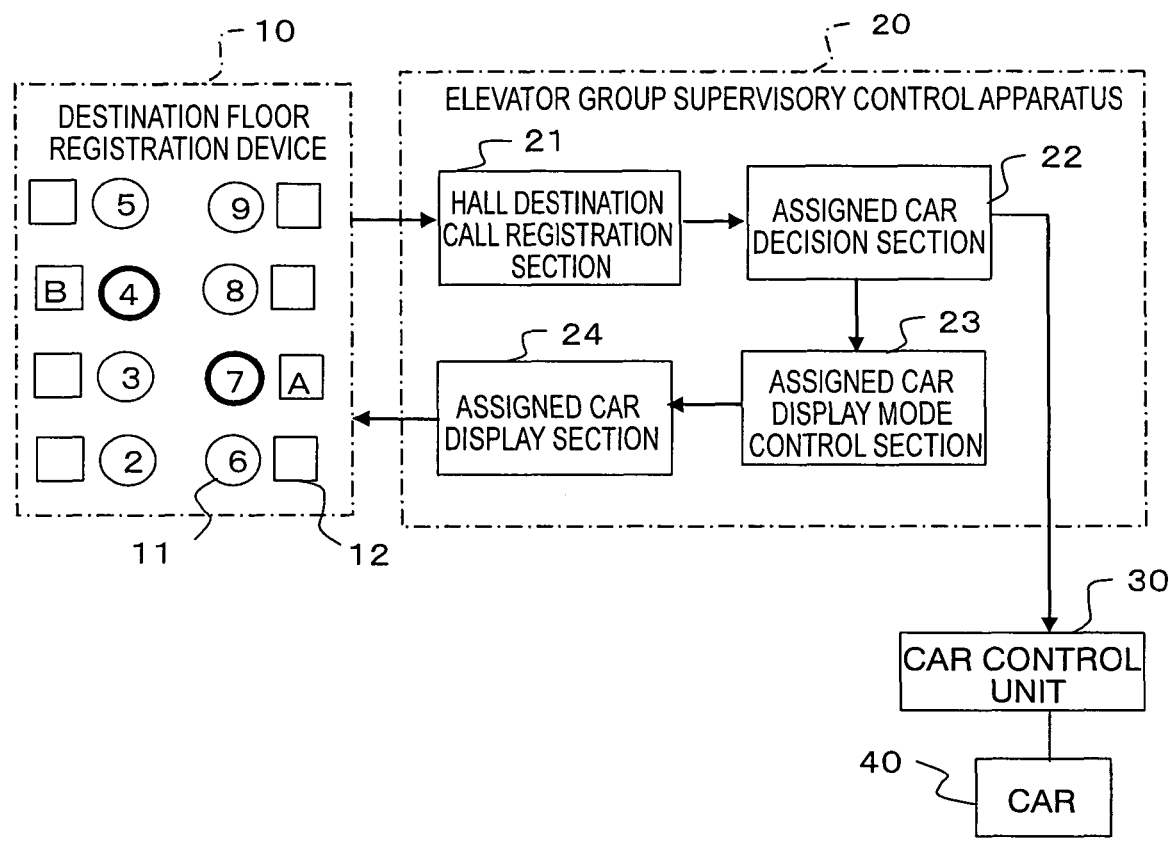
FIG. 1 is a block diagram showing the overall configuration of a hall display device for an elevator according to a first embodiment of the present invention (Embodiment 1).

FIG. 1 is a block diagram that shows the overall configuration of a hall display device for an elevator together with its associated peripheral devices according to a first embodiment of the present invention.

In FIG. 1, a destination floor registration device 10 is provided with a plurality of destination buttons 11 that are installed in a hall of each service floor for an elevator car 40 (hereinafter also referred to simply as a "car"), and arranged corresponding to the each floor, and assigned car display panels 12 arranged adjacent and corresponding to the destination buttons 11, respectively.

An elevator group supervisory control apparatus 20 includes a hall destination call registration section 21 that registers a hall destination call corresponding to a destination button 11 operated, an assigned car decision section 22 that decides an assigned car that is to respond to the hall destination call registered, an assigned car display mode control section 23 that sets a display mode of the assigned car, and an assigned car display section 24 that displays the assigned car on an assigned car display panel 12 in a display mode set by the assigned car display mode control section 23.

The assigned car decision section 22 in elevator group supervisory control apparatus 20 is connected to a car control unit 30 that operates and controls a car 40.

The car control unit 30 cooperates with the elevator group supervisory control apparatus 20 to control a plurality of cars 40 so as to make an assigned car decided by the assigned car decision section 22 respond to a registered hall destination call.

In FIG. 1, when a desired destination button 11 is operated by a passenger in a hall in which the passenger is waiting, a desired destination floor is registered, and in the elevator group supervisory control apparatus 20, an assigned car that is to respond to the hall destination call is decided and displayed on a corresponding assigned car display panel 12.

Specifically, in response to the operation of a destination button 11, the elevator group supervisory control apparatus 20 registers a hall destination call corresponding to a destination floor by the hall destination call registration section 21, decides an assigned car that is to respond to the hall destination call by the assigned car decision section 22, sets a display mode for the assigned car by the assigned car display mode control section 23, and displays the assigned car on a corresponding assigned car display panel 12 by the assigned car display section 24.

In this case, there is shown a state in which destination buttons 11 for the 4th floor and the 7th floor (see thick frames) are operated by passengers in the hall in which the destination floor registration device 10 is installed, and a car B and a car A are assigned to the destination floors, respectively (see "A" and "B" in the assigned car display panel 12), with the cars thus assigned being displayed.

The assigned car display mode control section 23 has a timing section for measuring a predetermined time, and it sets the display of an assigned car on a corresponding assigned car display panel 12 to a first display mode (e.g., blinking display) over a period of time until a predetermined time has elapsed after the start of display of the assigned car, and sets the display of the assigned car to a second display mode (e.g., lighting display) after the predetermined time has elapsed from the start of display of the assigned car.

Here, note that the display modes for assigned cars can be distinguished from one another depending on the difference between display colors, etc.

The assigned car display section 24 displays the assigned car on the assigned car display panel 12 in a display mode set by the assigned car display mode control section 23.

The elevator group supervisory control apparatus 20 and the car control unit 30 are constituted by a microcomputer (hereinafter also referred to as a "micron"). The elevator group supervisory control apparatus 20 manages a plurality of cars 40 as a group or family, and the car control unit 30 controls the operation of each car 40.

Figure 2:
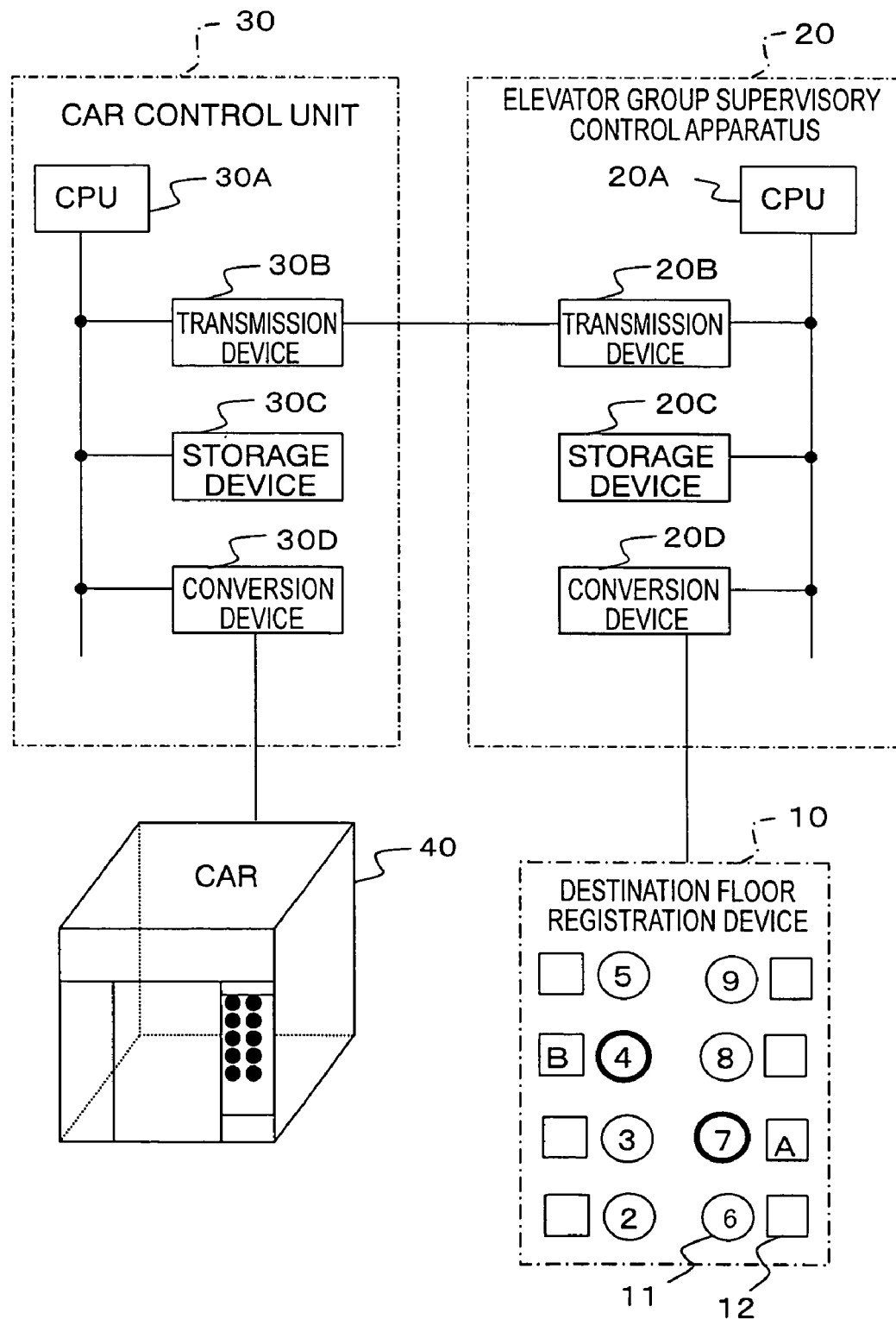
FIG. 2 is a block diagram showing a circuit configuration of the hall display device for an elevator according to the first embodiment of the present invention (Embodiment 1).

FIG. 2 is a block diagram that shows the circuit configuration of a hall display device for an elevator according to the first embodiment of the present invention, wherein the configuration of the elevator group supervisory control apparatus 20 and the car control unit 30 are illustrated.

In FIG. 2, the elevator group supervisory control apparatus 20 includes a central processing unit 20A (hereinafter referred to as a "CPU"), a transmission device 20B that sends and receives data to and from the car control unit 30, a storage device 20C that stores programs and data, and a conversion device 20D that converts the signal level of input and output data.

Similarly, the car control unit 30 includes a CPU 30A, a transmission device 30B that sends and receives data to and from the elevator group supervisory control apparatus 20, a storage device 30C that stores programs and data, and a conversion device 30D that converts the signal level of input and output data.

The elevator group supervisory control apparatus 20 and the car control unit 30 are connected to each other through the transmission devices 20B, 30B.

The destination floor registration device 10 in each hall is connected to the conversion device 20D in the elevator group supervisory control apparatus 20, and each car 40 is connected to the conversion device 30D in the car control unit 30.

In addition, processing programs for the hall destination call registration section 21, the assigned car decision section 22, the assigned car display mode control section 23, and the assigned car display section 24 are stored in the storage device 20C in the elevator group supervisory control apparatus 20.

Hereinafter, reference will be made to a specific operation according to the first embodiment of the present invention while referring to a flow chart in FIG. 3 together with FIG. 1 and FIG. 2.

Figure 3:
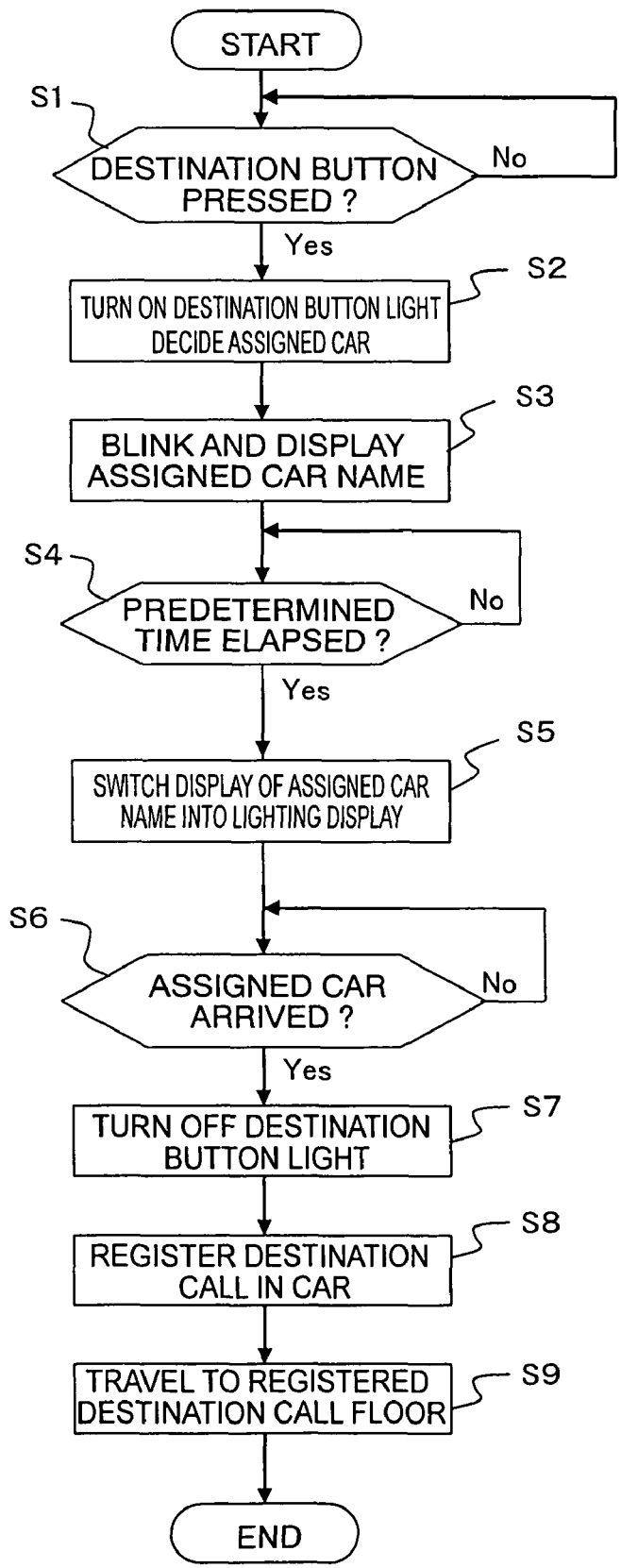
FIG. 3 is a flow chart illustrating a specific operation example of the hall display device for an elevator according to the first embodiment of the present invention (Embodiment 1).

In FIG. 3, first of all, a destination floor registration device 10 installed in a hall determines whether any destination button 11 is pressed in the hall (step S1), and when it is determined that any destination button 11 is not pressed (that is, No), the step S1 is repeated until a destination button 11 is pressed, so that an operation of some destination button 11 is waited for.

On the other hand, when it is determined in step S1 that some destination button 11 is pressed (that is, Yes), the destination button light of the destination button 11 thus operated is turned on, and a corresponding destination floor is registered and input to the elevator group supervisory control apparatus 20, whereby an assigned car, which is to respond to the hall destination call, is decided by the hall destination call registration section 21 and the assigned car decision section 22.

Subsequently, the assigned car name (e.g., car "A", car "B", etc.) decided in step S2 is displayed on a corresponding assigned car display panel 12 of the destination floor registration device 10 in a blinking manner by means of the assigned car display mode control section 23 and the assigned car display section 24 (step S3).

Then, it is determined whether a predetermined time has elapsed (step S4), and when it is determined that the predetermined time has not elapsed (that is, No), the lapse of the predetermined time is waited while repeating the step S4.

On the other hand, when it is determined in step S4 that the predetermined time has elapsed (that is, Yes), the assigned car display mode control section 23 and the assigned car display section 24 switch the assigned car display mode according to the assigned car display panel 12 into a lighting display (step S5).

Next, the destination floor registration device 10 determines, under the control of the elevator group supervisory control apparatus 20 and the car control unit 30, whether the assigned car has arrived at the floor on which the operated destination button 11 (the destination floor registration device 10) is installed (step S6).

When it is determined in step S6 that the assigned car has not yet arrived at that floor (that is, No), the arrival of the assigned car is waited while repeating the step S6.

On the other hand, when it is determined in step S6 that the assigned car has arrived at that floor (that is, Yes), the destination button light of the destination button 11 to which the assigned car has responded is turned off (step S7).

Finally, a destination call in the car (incar destination call) corresponding to the floor of the hall destination call is automatically registered for the assigned car arrived (step S8), and the assigned car is controlled to travel to the floor of the incar destination call thus automatically registered, and the processing routine of FIG. 3 is terminated.

For example, in a destination floor registration device 10 installed on the 1st floor of a building, in case where destination buttons 11 are operated, as shown in FIG. 1 and FIG. 2, to generate hall destination calls to the 4th floor and the 7th floor, an incar destination call to the 4th floor is automatically registered in the car B when an assigned car (car B), having responded to the hall destination call to the 4th floor, has arrived at the 1st floor, whereby the car B is caused to travel to the 4th floor.

Thus, the destination floor registration device 10 having the destination button 11 and the assigned car display panel 12 is installed in the elevator hall, and the assigned car display mode control section 23 is installed in the elevator group supervisory control apparatus 20 connected to the destination floor registration device 10, wherein by setting the display mode for an assigned car to a blinking display over a predetermined period of time after the start of display of the assigned car on an assigned car display panel 12, a passenger waiting in the hall can easily recognize the assigned car, and can be smoothly prompted or invited to ride on the assigned car upon arrival thereof.

Although in the above-mentioned embodiment, the assigned car name (car A or car B) displayed on a corresponding assigned car display panel 12 is blinked over the predetermined time in step S3, the display mode is not limited to blinking but may be any even if the display is noticeable to the waiting passenger. For example, the display color may be set to be different from the one at ordinary times over a predetermined time.

Embodiment 2

Figure 4:
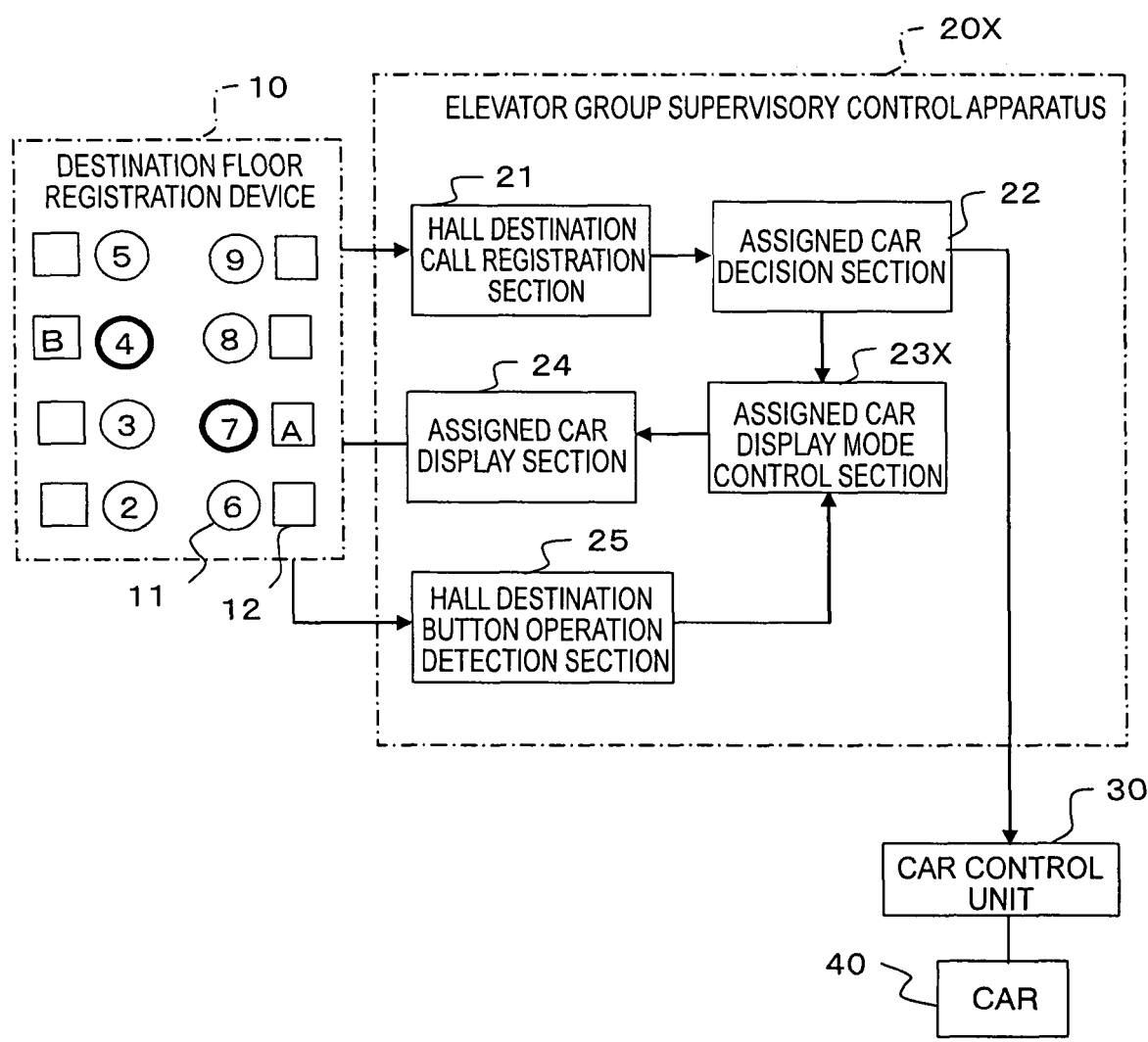
FIG. 4 is a block diagram showing the overall configuration of a hall display device for an elevator according to a second embodiment of the present invention (Embodiment 2).

Although in the above-mentioned first embodiment, the display mode is specially set over the predetermined time after the display of the assigned car is started, a hall destination button operation detection section 25 may be provided, as shown in FIG. 4, so that even when it is detected that a destination button 11 with its destination button light having already been turned on is operated for example, the assigned car display mode can be specially set over a predetermined time.

FIG. 4 is a block diagram that shows the overall configuration of a second embodiment of the present invention. In FIG. 4, the same parts or components as those described above (see FIG. 1) are identified by the same symbols or by the same symbols with "X" affixed to their ends, while omitting a detailed explanation thereof.

In this case, an elevator group supervisory control apparatus 20X is provided with the hall destination button operation detection section 25 that detects an operation of each destination button 11, and a detection signal from the hall destination button operation detection section 25 is input to an assigned car display mode control section 23X.

Accordingly, the assigned car display mode control section 2X sets the assigned car display mode to a special mode (e.g., blinking display) over a predetermined time after detecting that a destination button 11 is operated.

Here, note that the circuit configuration of the second embodiment of the present invention is as shown in FIG. 2, so an explanation thereof is omitted.

Hereinafter, reference will be made to a specific operation according to the second embodiment of the present invention while referring to a flow chart in FIG. 5 together with FIG. 4.

Figure 5:
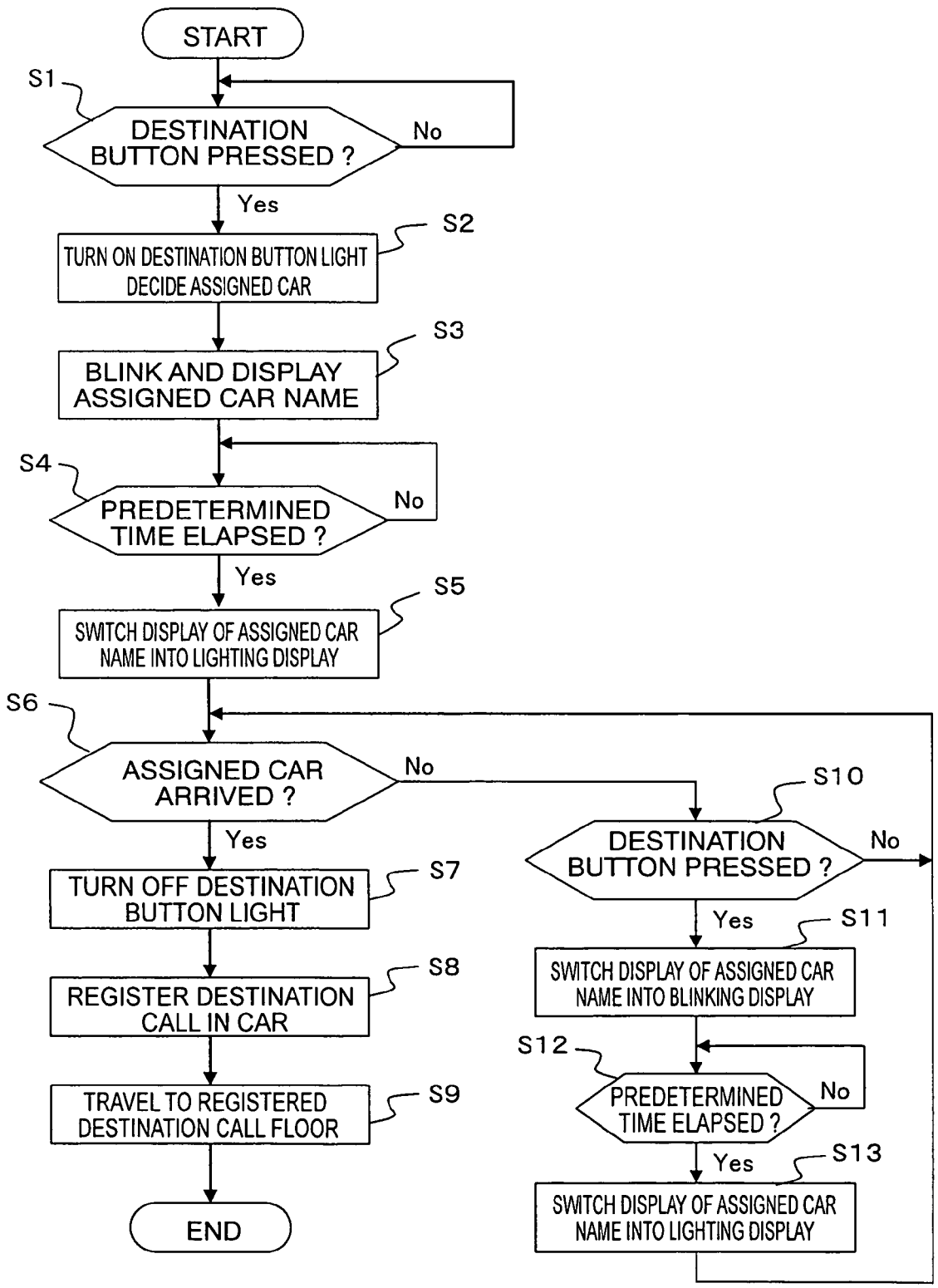
FIG. 5 is a flow chart illustrating a specific operation example of the hall display device for an elevator according to the second embodiment of the present invention (Embodiment 2).

In FIG. 5, steps S1 through S9 are the same processes as those described above (see FIG. 3).

First of all, it is waited until a destination button 11 installed in a hall is pressed (step S1), and when a destination button 11 is pressed, the destination button light of that destination button 11 is turned on, and an assigned car, which is to respond to that destination button 11, is decided (step S2).

Subsequently, the name of the assigned car thus decided is displayed on a corresponding assigned car display panel 12 in a blinking manner (step S3), and the lapse of a predetermined time is waited (step S4), so that when the predetermined time has elapsed, the display mode for the assigned car is switched into a lighting display (step S5).

Then, it is determined whether the assigned car has arrived at the installation floor of the destination button 11 in the hall (step S6), and when the assigned car has arrived, the turning off of the destination button light, the automatic registration of the incar destination call, and the traveling of the car to the destination call floor (steps S7 through S9) are executed, and the processing routine of FIG. 5 is terminated.

On the other hand, when it is determined in step S6 that the car has not yet arrived (that is, No), it is further determined whether a destination button 11 has been pressed (step S10).

When it is determined in step S10 that any destination button 11 has not been pressed (that is, No), a return is carried out to step S6 where the arrival of the assigned car is waited.

When it is determined in step S10 that a destination button 11 has been pressed (that is, Yes), the display of the assigned car is switched into a blinking display (step S11), and it is determined whether a predetermined time has elapsed (step S12).

At this time, even in case where a destination button 11 with its destination button light having already been turned on is pressed again, the display of the assigned car in the corresponding assigned car display panel 12 is switched into a blinking display.

When it is determined that the predetermined time has not elapsed (that is, No), the lapse of the predetermined time is waited while repeating the step S12.

On the other hand, when it is determined in step S12 that the predetermined time has elapsed (that is, Yes), the display of the assigned car is switched into a blinking display (step S13), and a return to step S6 is carried out.

Thus, the assigned car display mode control section 23X can set the display of the assigned car to a special display mode (e.g., blinking display) over a predetermined time not only after the decided assigned car is displayed but also after a destination button 11 is operated, in response to a detection signal from the hall destination button operation detection section 25, and also set the display of the assigned car to an ordinary display mode (lighting display) after the predetermined time has elapsed from the time when the destination button 11 is operated.

In addition, even when a destination button 11 having already been lit is pressed, a detection signal from the hall destination button operation detection section 25 is input to the assigned car display mode control section 23X, so the assigned car display panel 12 can be switched into a special display over the predetermined time immediately after the operation of the destination button 11.

Accordingly, as stated above, it is possible to make a passenger, who has operated a destination button 11, clearly recognize an assigned car, and to prompt the passenger to ride on the assigned car upon arrival thereof.

Embodiment 3

Figure 6:
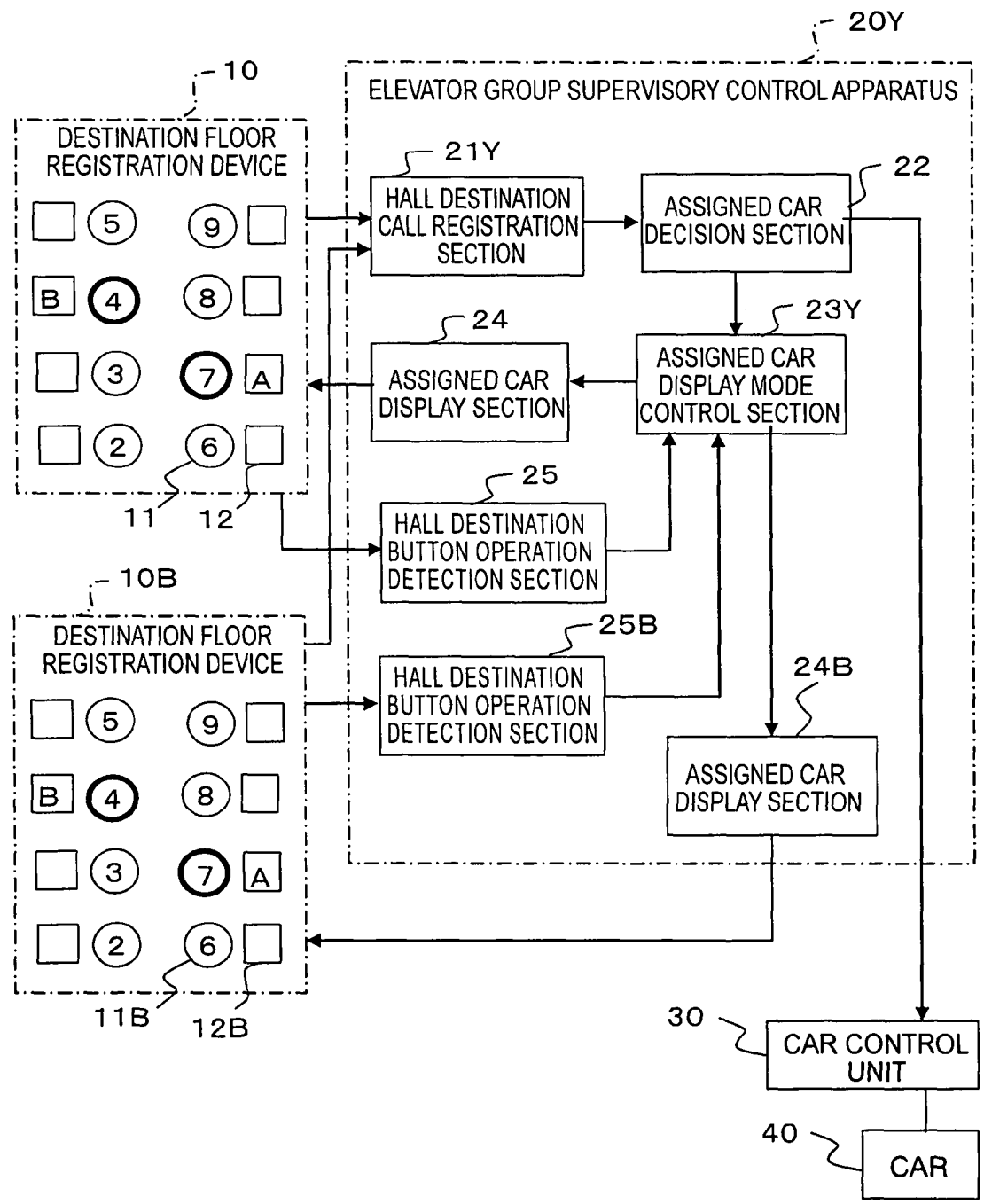
FIG. 6 is a block diagram showing the overall configuration of a hall display device for an elevator according to a third embodiment of the present invention (Embodiment 3).
Figure 7:
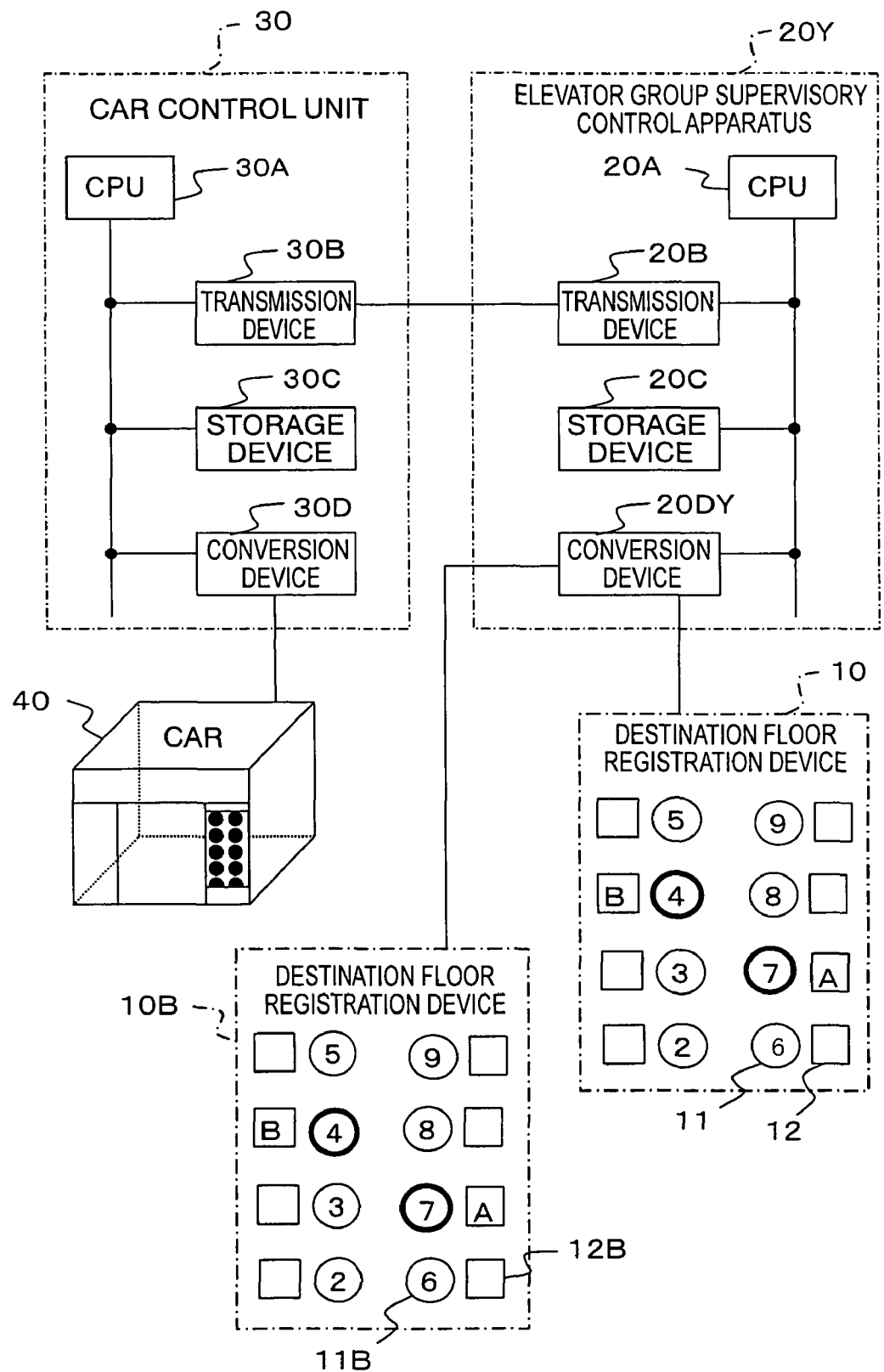
FIG. 7 is a block diagram showing a circuit configuration of the hall display device for an elevator according to the third embodiment of the present invention (Embodiment 3).

In the above-mentioned second embodiment, reference has been made to the case where one destination floor registration device 10 is installed for one hall, but as shown in FIG. 6 and FIG. 7, a plurality of destination floor registration devices 10, 10B may be provided for one hall, and an assigned car may be specially displayed only on an assigned car display panel of one of the destination floor registration devices in which a destination button has been operated.

FIG. 6 is a block diagram that shows the overall configuration of a third embodiment of the present invention, and FIG. 7 is a block diagram that illustrates the circuit configuration of the third embodiment of the present invention.

In FIGS. 6 and 7, the same parts or components as those described above (see FIGS. 4 and 2) are identified by the same symbols or by the same symbols with "Y" affixed to their ends, while omitting a detailed explanation thereof.

In this case, in a hall in which the destination floor registration device 10 is installed, not only the first destination floor registration device 10 but also the second destination floor registration device 10B of the same configuration as that of the first destination floor registration device 10 are arranged in parallel to each other, and are respectively connected to an elevator group supervisory control apparatus 20Y.

The destination floor registration device 10B has destination buttons 11B and corresponding assigned car display panels 12B arranged adjacent to each other.

The elevator group supervisory control apparatus 20Y is provided with an assigned car display section 24B and a hall destination button operation detection section 25B that are interposed between the destination floor registration device 10B and an assigned car display mode control section 23Y.

The assigned car display section 24B makes an assigned car displayed on a assigned car display panel 12B of the destination floor registration device 10B, and the hall destination call operating detection section 25B inputs a detection signal to the assigned car display mode control section 23Y upon detection of an operation of a destination button 11B.

In addition, the plurality (2 in this case) of destination floor registration devices 10, 10B are connected to a hall destination call registration section 21Y in the elevator group supervisory control apparatus 20Y, so that the hall destination call registration section 21Y can register hall destination calls corresponding to operations of the destination buttons 11, 11B of the respective destination floor registration devices 10, 10B.

The assigned car display section 24B makes an assigned car displayed on a assigned car display panel 12B of the destination floor registration device 10B, and the hall destination button operation detection section 25B inputs a detection signal to the assigned car display mode control section 23Y upon detection of an operation of a destination button 11B.

The hall destination button operation detection sections 25, 25B detect the operation states of the individual destination buttons 11, 11B of the destination floor registration devices 10, 10B, respectively.

In FIG. 6, when hall destination calls are registered in the elevator group supervisory control apparatus 20Y and cars assigned to the calls, respectively, are decided in response to operations of the individual destination buttons 11, 11B, the assigned cars are displayed on the individual assigned car display panels 12, 12B of the destination floor registration devices 10, 10B, respectively.

In addition, in FIG. 7, a conversion device 20DY in the elevator group supervisory control apparatus 20Y is connected to the destination floor registration devices 10, 10B.

The assigned car display mode control section 23Y sets the display of an assigned car on an assigned car display panel 12 (or 12B) of the destination floor registration device 10 (or 10B) in which a destination button 11 is operated, among the destination floor registration devices 10, 10B, to a first display mode (e.g., blinking display) over a period of time from the start of the display of the assigned car on the assigned car display panels 12, 12B until a predetermined time elapses, and sets the display of the assigned car on the assigned car display panel of the destination floor registration device in which that destination button 11 (or 11B) is operated to a second display mode (e.g., lighting display) after the predetermined time has elapsed from the start of the display of the assigned car.

Hereinafter, reference will be made to a specific operation according to the third embodiment of the present invention while referring to a flow chart in FIG. 8 together with FIG. 6 and FIG. 7.

Figure 8:
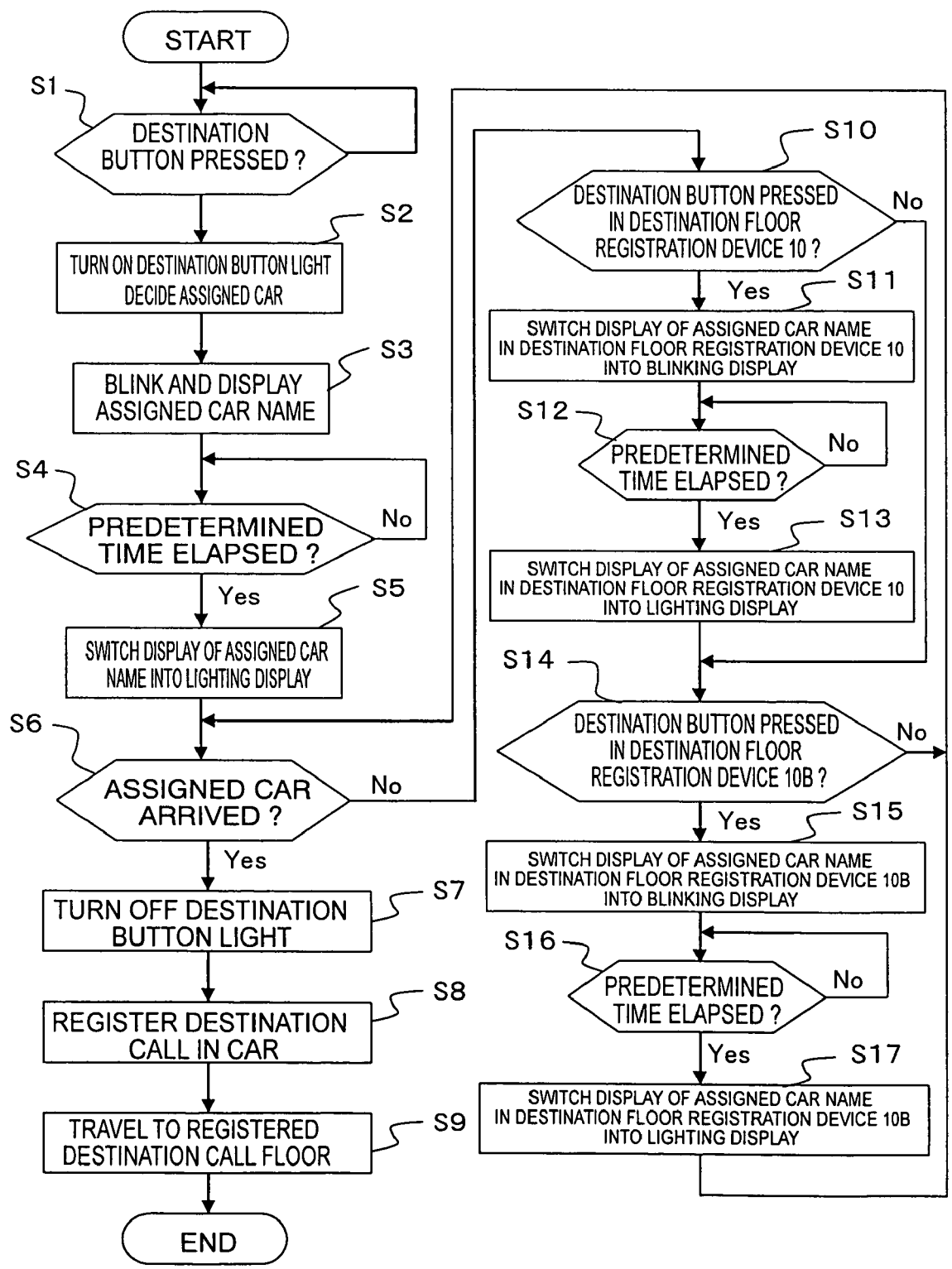
FIG. 8 is a flow chart illustrating a specific operation example of the hall display device for an elevator according to the third embodiment of the present invention (Embodiment 3).

In FIG. 8, steps S1 through S9 are the same processes as those described above (see FIG. 3 and FIG. 5).

Also, steps S10 through S13 are the same processes as those described above (see FIG. 5), and steps S14 through S17 are processes corresponding to steps S10 through S13.

First of all, it is waited until a destination button 11 or 11B installed in a hall is pressed (step S1), as stated above, and when a destination button 11 or 11B is pressed, the destination button light of that destination button 11 or 11B is turned on, and an assigned car, which is to respond to that destination button, is decided (step S2).

Subsequently, the name of the assigned car thus decided is displayed on corresponding assigned car display panels 12, 12B in a blinking manner (step S3), and the lapse of a predetermined time is waited (step S4), so that when the predetermined time has elapsed, the display mode for the assigned car is switched into a lighting display (step S5).

Then, it is determined whether the assigned car has arrived at the installation floor of the destination floor registration devices 10, 10B (the destination buttons 11, 11B) (step S6), and when the assigned car has arrived, steps S7 through S9 are executed.

On the other hand, when the assigned car has not yet arrived, it is determined whether a destination button 11 of the first destination floor registration device 10 has been pressed (step S10), and when it is determined that any destination button 11 has not been pressed (that is, No), the control flow advances to the determination processing of a destination button 11B in the second destination floor registration device 10B (step S14).

On the other hand, when it is determined in step S10 that a destination button 11 has been pressed (that is, Yes), the display mode of the assigned car on a corresponding assigned car display panel 12 of the destination floor registration device 10 is switched into a blinking display (step S11), and the lapse of a predetermined time is waited (step S12).

At this time, even in case where a destination button 11 with its destination button light having already been turned on is pressed again, the display of the assigned car in the corresponding assigned car display panel 12 is switched into a blinking display.

When it is determined in step S12 that the predetermined time has elapsed (that is, Yes), the display mode of the assigned car on the corresponding assigned car display panel 12 of the destination floor registration device 10 is switched into a lighting display (step S13), and it is determined whether a destination button 11B of the second destination floor registration device 10B is pressed (step S14).

When it is determined in step S14 that any destination button 11B has not been pressed (that is, No), a return is carried out to step S6, whereas when it is determined that a destination button 11B has been pressed (that is, Yes), the display mode of the assigned car on a corresponding assigned car display panel 12B of the destination floor registration device 10B is switched into a blinking display (step S15), and the lapse of the predetermined time is waited (step S16).

At this time, even in case where a destination button 11B with its destination button light having already been turned on is pressed again, the display of the assigned car in the corresponding assigned car display panel 12B is switched into a blinking display.

When it is determined in step S16 that the predetermined time has elapsed (that is, Yes), the display mode of the assigned car on the corresponding assigned car display panel 12B of the destination floor registration device 10B is switched into a lighting display (step S17), and a return to step S6 is carried out.

The processes in steps S7 through S9 are similar to the above-mentioned ones, so an explanation thereof is omitted here.

Thus, by installing the plurality of destination floor registration devices 10, 10B in one and the same hall, and connecting the individual destination floor registration devices 10, 10B to the elevator group supervisory control apparatus 20Y, it is possible to display, in response to an operation of a destination button 11 or 11B, an assigned car on the individual assigned car display panels 12, 12B corresponding to a destination floor at the same time, and to set the display mode of only the assigned car display panel 12 or 12B of that one of the destination floor registration devices 10, 10B which has been operated to a special display mode (blinking display or different display color) over a predetermined time from the start of the display of the assigned car.

In addition, even when a destination button 11 or 11B having already been lit is pressed, a detection signal from the hall destination button operation detection section 25 or 25B is input to the assigned car display mode control section 23Y, so a corresponding assigned car display panel 12 or 12B for the destination button thus pressed can be switched into a special display over the predetermined time immediately after the operation of the destination button.

Accordingly, similarly as stated above, it is possible to make a passenger, who has operated that destination button 11 or 11B, clearly recognize an assigned car, and to prompt the passenger to ride on the assigned car upon arrival thereof.

The invention claimed is:

1. A hall display device for an elevator comprising:
    an elevator group supervisory control apparatus that controls a plurality of elevator cars; and
    a destination floor registration device that is connected to said elevator group supervisor control apparatus, and installed in each of halls corresponding to service floors for said plurality of elevator cars, said destination floor registration device having destination buttons and assigned car display panels that are arranged adjacent to said destination buttons, respectively;
    said elevator group supervisor control apparatus including:
    a hall destination call registration section that registers a hall destination call corresponding to an operation of said destination button;
    an assigned car decision section that decides an assigned car that is to respond to said hall destination call;
    an assigned car display mode control section that sets a display mode of said assigned car; and
    an assigned car display section that makes said assigned car displayed on one of said assigned car display panels in the display mode set by said assigned car display mode control section;
    wherein when said hall destination call is registered and said assigned car is decided in response to the operation of said destination button, said assigned car is displayed on said one assigned car display panel; and
    said assigned car display mode control section sets the display of said assigned car to a first display mode over a period of time from the start of the display of said assigned car on said one assigned car display panel until a predetermined time has elapsed, and sets the display of said assigned car to a second display mode after said predetermined time has elapsed from the start of the display of said assigned car.

2. The hall display device for an elevator as set forth in claim 1, wherein
    said elevator group supervisory control apparatus includes a hall destination button operation detection section that detects an operation state of each of said destination buttons; and
    said assigned car display mode control section sets the display of said assigned car to a first display mode over a period of time from a time point at which said one destination button is operated in response to a detection signal from said hall destination button operation detection section until said predetermined time has elapsed, and sets the display of said assigned car to a second display mode after said predetermined time has elapsed from the operation of said one destination button.

3. The hall display device for an elevator as set forth in claim 1, wherein
    said destination floor registration device includes a plurality of destination floor registration devices that have the same construction with respect to one another, and are installed in one and the same hall in parallel to one another; and when said hall destination call is registered and said assigned car is decided in response to an operation of one of said individual destination buttons of said plurality of destination floor registration devices, said assigned car display mode control section and said assigned car display section make said assigned car displayed on an individual assigned car display panel of each of said plurality of destination floor registration devices in a display mode set by said assigned car display mode control section, and at the same time sets only the display of said assigned car on an assigned car display panel of one of said destination floor registration devices in which said one destination button has been operated, among said plurality of destination floor registration devices, to a first display mode over a period of time from the start of the display of said assigned car on said assigned car display panels until said predetermined time has elapsed.

4. The hall display device for an elevator as set forth in claim 1, wherein
said first display mode is a blinking display; and
said second display mode is a lighting display.

5. The hall display device for an elevator as set forth in claim 1, wherein
said first display mode is a first color display; and
said second display mode is a second color display different from said first color display.

* * * * *